US012796605B2

(12) United States Patent
Mahieu et al.

(10) Patent No.: US 12,796,605 B2
(45) Date of Patent: Nov. 17, 2026

(54) METHOD FOR CALIBRATING A TAILINGS RETURN SENSOR IN A COMBINE HARVESTER

(71) Applicant: CNH Industrial Belgium N.V., Zedelgem (BE)

(72) Inventors: Thomas Mahieu, West-Vleteren (BE); Arno Leenknegt, Hooglede (BE); Pieter Maelegheer, Knokke-Heist (BE)

(73) Assignee: CNH Industrial Belgium N.V. (BE)

(*) Notice: Subject to any disclaimer, the term of this patent is extended or adjusted under 35 U.S.C. 154(b) by 173 days.

(21) Appl. No.: 18/948,596

(22) Filed: Nov. 15, 2024

(65) Prior Publication Data

US 2026/0137028 A1 May 21, 2026

(30) Foreign Application Priority Data

Oct. 23, 2023 (EP) .................................... 23205330

(51) Int. Cl.
*A01D 41/127* (2006.01)

(52) U.S. Cl.
CPC ................................ *A01D 41/1272* (2013.01)

(58) Field of Classification Search
CPC ............ A01D 41/1272; A01D 41/1271; A01D 41/1276; A01F 12/52
See application file for complete search history.

(56) References Cited

U.S. PATENT DOCUMENTS

| | | | | |
|---|---|---|---|---|
| 8,282,453 B1* | 10/2012 | Hillen | A01D 41/1276 340/684 |
| 2005/0245300 A1* | 11/2005 | Maertens | A01F 12/446 460/59 |
| 2007/0161422 A1 | 7/2007 | Behnke et al. | |
| 2017/0311543 A1 | 11/2017 | Leenknegt et al. | |
| 2020/0245562 A1* | 8/2020 | Hermann | A01D 41/127 |

FOREIGN PATENT DOCUMENTS

| | | | |
|---|---|---|---|
| CN | 112715136 A * | 4/2021 | G01F 23/80 |
| EP | 1516522 A2 | 3/2005 | |
| EP | 1516522 A3 | 4/2005 | |
| EP | 3238528 A1 | 11/2017 | |

OTHER PUBLICATIONS

Extended European Search Report dated Mar. 11, 2024 issued by the European Patent Office in corresponding European Patent Application No. 23205330.6. (5 pages).

* cited by examiner

*Primary Examiner* — Ig T An
(74) *Attorney, Agent, or Firm* — Buchanan Ingersoll & Rooney PC

(57) ABSTRACT

A method is provided for calibrating a tailings return sensor and measuring an amount of crop material in a tailings return system of a combine harvester. The method includes the consecutive steps of repeatedly harvesting a crop with the combine harvester in a set configuration, ceasing to harvest the crop while continuing to operate crop processing systems of the combine harvester, and determining a run-empty parameter, representative of an amount of the crop that is processed by the combine harvester after ceasing to harvest the crop. The tailings return sensor is calibrated using the different run-empty parameters obtained after harvesting in different configurations.

10 Claims, 3 Drawing Sheets

METHOD FOR CALIBRATING A TAILINGS RETURN SENSOR IN A COMBINE HARVESTER

CROSS REFERENCE TO RELATED APPLICATION

This application claims priority to European Patent Application No. 23205330.6, filed Oct. 23, 2023, the contents of such application being incorporated herein by reference.

TECHNICAL FIELD

The present invention relates to a method of controlling a combine harvester. The present invention further relates to a controller and software for performing such a method and to a combine harvester equipped with hardware configured to do so.

BACKGROUND OF THE INVENTION

Modern agricultural harvesters are complex machines with many structural and functional parts, arranged to perform a plurality of different functions related to the harvesting of specific crops or types of crops. A combine harvester, for example, is equipped with a plurality of functional units for the harvesting and processing of grain and grain-like crops. The main functions of a combine harvester include the cutting and taking in of the crop, threshing the grains from the stalks in a threshing section, separating the chaff from the grain kernels in a cleaning section, and releasing the straw and chaff residue from the harvester.

To optimise various output parameters, such as, crop yield, harvesting time, fuel efficiency, etc., many operational parameters of the agricultural harvester are adjustable while harvesting. The adjustment of the many structural and functional parts of the agricultural harvester may be done by an operator, based on real-time sensor data and/or his own observations, or automatically based on real-time sensor data and appropriately designed control algorithms. In a combine harvester, for example, a driving speed may be adapted to control a feed rate, and a header height may be adjusted to control an amount of straw material that is taken in together with the harvested grain.

Often, a tailings return system is provided to bring unthreshed ears, also called tailings, that have managed to pass through the threshing concave back to the threshing section. In addition to unthreshed and incompletely threshed ears, the tailings may include other grain and MOG that fell off the rear end of the cleaning section. The amount of such material passing through the tailings return system depends on, e.g., the size of the sieve openings, the fan speed of the cleaning fans, and the amount of crop material that is harvested per unit of time. In the following, this amount of crop material that passes through the tailings return system may also be referred to as tailings return volume.

Operational parameters of the threshing system can be adjusted while harvesting. As a result of such parameter changes, the aggressiveness of the threshing process is changed, which will influence the amount of unthreshed ears ending up in the tailings return system. While the volume of unthreshed ears may be minimised by choosing highly aggressive threshing parameters, this will come with the undesirable side effects of damaged straw, increased energy expenditure, increased wear of parts, and possible blockage of the complete threshing system. Similarly, other operational parameters, like header height, driving speed, fan speed and sieve openings are continuously adjusted to ensure that the full capacity of the threshing and cleaning systems is being used without causing blockages, grain loss, or excessive volumes of tailings in the tailings return system.

Accordingly, an optimisation process is needed to find the optimal operational settings. To assist in finding these optimal settings, a tailings return sensor may be provided in the tailings return system. The tailings return sensor can provide direct feedback indicating an amount of crop material that moves through the tailings return system. The tailings return sensor can thus be used to determine when it may be desirable, or unnecessary, to thresh more aggressively, to open or close the sieve openings, to adjust the fan speed of the cleaning fans, etc. It has, however, been observed that the feedback signals from the tailings return sensor are highly dependent on, e.g., crop type, harvesting speed, and harvesting conditions. As a result it may be difficult to effectively adapt important operational settings of the combine harvester based on the tailings return sensor signals.

To make better use of the such tailings return sensors, it thus is important that the sensor is properly calibrated. It is an aim of the present invention to provide such proper calibration.

SUMMARY OF THE INVENTION

According to an aspect of the invention there is provided a method of calibrating a tailings return sensor for measuring an amount of crop material in a tailings return system of a combine harvester. The method comprising the consecutive steps of harvesting a crop with the combine harvester in a first configuration, ceasing to harvest the crop while continuing to operate crop processing systems of the combine harvester, determining a first run-empty parameter, representative of a first amount of the crop that is processed by the combine harvester after ceasing to harvest the crop, resuming harvesting the crop with the combine harvester in a second configuration, again ceasing to harvest the crop while continuing to operate the crop processing systems of the combine harvester, determining a second run-empty parameter, representative of a second amount of the crop that is processed by the combine harvester after ceasing to harvest the crop, and calibrating the tailings return sensor based on the first run-empty parameter and the second run-empty parameter. The first configuration and the second configuration are herein designed to cause a significantly different amount of crop material in the tailings return system.

With the method according to the invention, it is made possible to accurately estimate a variation in amount of crop material that may pass through the tailings return system during operation of the combine harvester. When ceasing the harvesting, e.g., when driving out of the crop and onto the headland, no new crop material is pulled into the feeder and threshing system of the combine harvester. When the harvesting is paused, recently harvested crop material will still be present inside the combine harvester. Because the crop processing systems will continue to process this crop material, sensors inside the combine harvester that monitor crop flow and crop processing will continue to provide above-baseline output values until all the remaining crop has been fully processed. Consequently, various sensors will provide sensor outputs that are representative of the time it takes to empty the crop processing systems and of the amount of crop that is processed during this run-empty period.

In the two different configurations, the tailings return system comprises significantly different amounts of crop material. As a result, the run-empty time for the crop processing systems and the run-empty profiles of the sensor signals will be different for the first and second configurations. Therefore, suitable run-empty parameters are used to estimate the tailings return volume occurring while harvesting in the two different configurations. Such suitable run-empty parameters may, for example, an amount of time needed to empty the monitored crop processing system or an amount of crop processed in such time period (mass and/or volume). The run-empty parameters may be determined for, for example, a tailings processor or a clean grain transport system.

Knowing the possible variation in the tailings return volume, the sensitivity of the tailings return sensor can be tuned such as to allow for the detection of minor variations in the amount of crop material being processed by the tailings return system, while ensuring that the tailings return sensor provides meaningful sensor output throughout the complete range of tailings return volumes that may occur. Accordingly, the calibration process allows for finding an optimal balance between sensor sensitivity and sensor range.

In preferred embodiments, the first configuration or the second configuration is designed to cause a minimum amount (e.g., at or below a predetermined threshold predetermined value) of crop material in the tailings return system. Possible measures to minimise the tailings return volume are aggressive threshing and opening the sieves of the cleaning system. When one of the two configurations results in the minimum amount of crop material in the tailings return system, a proper lower limit of the optimal sensor range for the tailings return sensor can be established. Additionally, the other configuration may be designed to cause a maximum amount of crop material (e.g., at or above a threshold predetermined threshold value) in the tailings return system, in order to further establish a proper upper limit of the optimal sensor range. Maximum tailings return volumes may, e.g., be obtained by reducing the threshing aggressiveness or substantially closing the sieve openings in one or more of the sieves of the cleaning system.

Preferably, the first configuration and the second configuration are designed to harvest the crop at a substantially similar feed rate. This will ensure that any variation in tailings return volume is fully caused by a variation of operational parameters of the threshing and cleaning sections of the combine harvester, and not by a variation in the amount of crop that is harvested. Best calibration results may be achieved when harvesting at a feed rate similar to the feed rate during normal operation. Alternatively, the calibration cycle is performed more than once at different feed rates.

The step of determining the first run-empty parameter and the step of determining the second run-empty parameter typically comprise measuring a time span between the ceasing to harvest the crop and an output signal of a crop flow sensor reaching a lower threshold. The output signal reaching this lower threshold is an indication that the tailings return system has been emptied completely. In addition to, or as an alternative of, measuring the time to run-empty, other characteristics of the signal profile may be observed and taken into account for determining the respective run-empty parameter.

The crop flow sensor signal being analysed may, e.g., be a signal from the tailings return sensor itself, or from a yield sensor for measuring an amount of clean grain being transported towards a grain tank of the combine harvester. Such yield sensors are typically installed in or adjacent to a clean grain elevator that elevates the clean grain from below the sieves of the cleaning system into the grain tank on top of the combine harvester.

According to a further aspect of the invention a non-transitory, computer-readable storage medium is provided, storing instructions thereon that when executed by one or more processors cause the one or more processors to execute a calibration method as described above.

According to yet another aspect of the invention, a combine harvester is provided comprising crop processing systems and a tailings return sensor for measuring an amount of crop material in a tailings return system, and characterised in that the combine harvester further comprises a controller, operatively coupled to the crop processing systems and the tailings return sensor and configured to perform any of the methods as described above.

BRIEF DESCRIPTION OF THE DRAWINGS

Embodiments of the invention will now be described by way of example with reference to the accompanying drawings, in which.

DETAILED DESCRIPTION OF THE INVENTION

Figure 1:
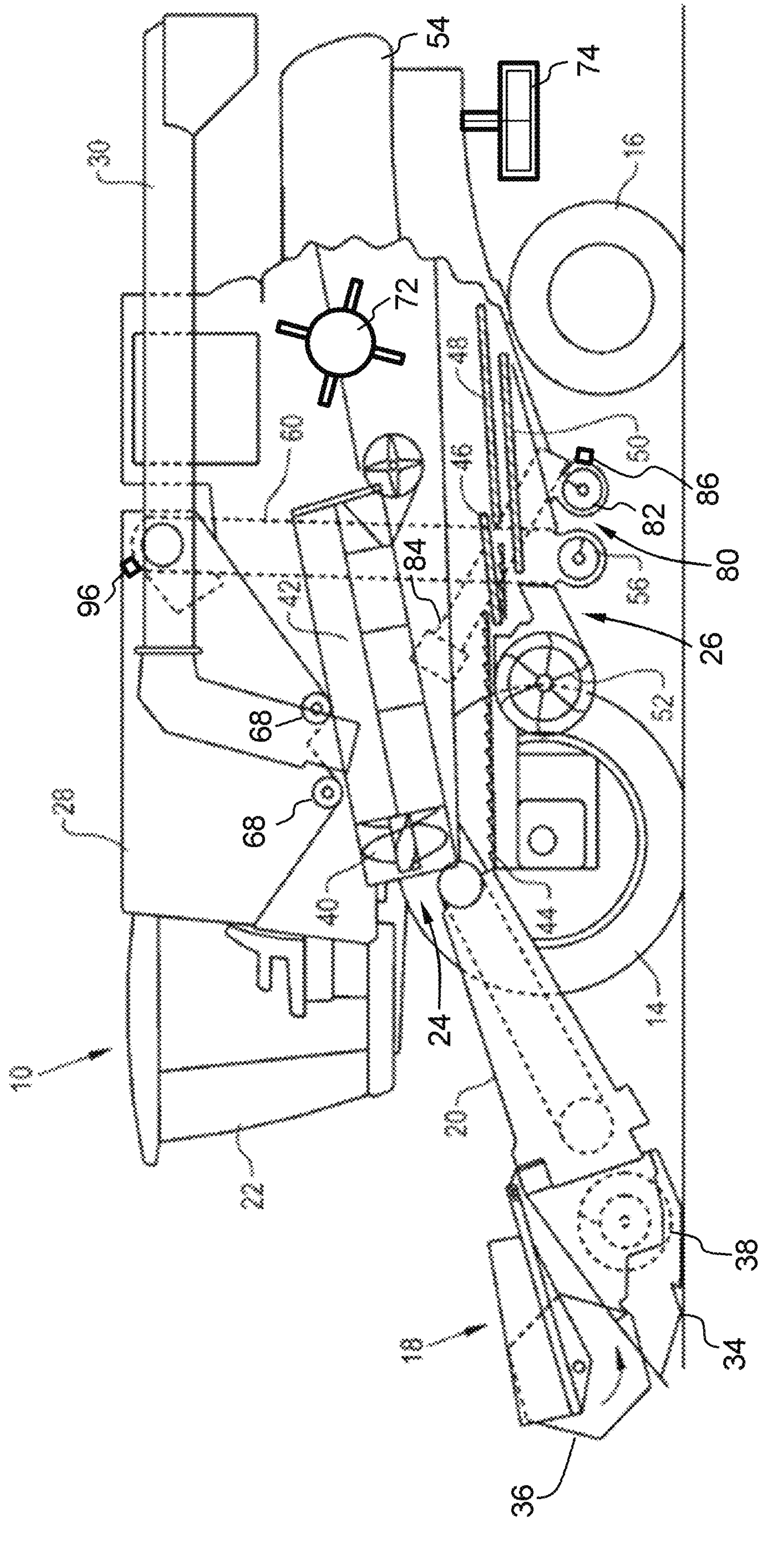
FIG. 1 schematically shows a combine harvester wherein the invention may be advantageously used.

FIG. 1 schematically shows a combine harvester 10. The combine harvester 10 generally includes front and rear round engaging wheels 14, 16, a header 18, a feeder 20, an operator cabin 22, a threshing and separation system 24, a cleaning system 26, a grain tank 28 and an unloading tube 30.

A header 18 is mounted to the front of the combine harvester 10 and includes a cutter bar 34 for severing crops from a field during forward motion of the combine. A rotatable reel 36 feeds the crop into the header 18, and a double auger 38 feeds the severed crop laterally from each side towards the feeder 20. The feeder 20 conveys the severed crop to the threshing and separation system 24.

The threshing and separation system 24 is of the axial-flow type and comprises a threshing rotor 40 at least partially located and rotatable within a threshing concave 42. The threshing concave may take the form of a perforated concave. Grain from the severed crop is threshed and separated from the material other than grain (MOG) by the action of the threshing rotor 40 within the threshing concave 42. Larger elements of MOG, such as stalks and leaves do not pass through the perforations in the threshing concave 42 and are discharged from the rear of the combine harvester 10.

The release of straw residue behind the combine harvester 10 may be done by dropping the straw in a swath on the field, for example to allow it being picked up by a baler machine later. Often, however, the straw residue is chopped into smaller pieces by a chopper 72 and spread over the field across the full width of the header 18 by a spreader system 74. The spreader system 74 typically comprises a left and a right rotary spreader, each spreading the chopped crop residue received from the chopper 72 laterally and away from the combine harvester 10. The chaff and other small MOG coming from the cleaning system 26 may be dropped on the field, spread over the field by a separate chaff spreader (not shown), or mixed in with the straw residue to be spread together therewith by the spreader system 74. The straw, chaff, and other MOG that is spread over the field serves as fertilizer for the soil.

Grain and smaller elements of MOG (small MOG henceforth), such as chaff, dust and straw are small enough to pass through the perforations in the threshing concave 42. Grain and small MOG that has successfully passed the threshing and separation system 24 falls onto a preparation pan 44 and is conveyed towards the cleaning system 26. The cleaning system comprises a series of sieves and a cleaning fan 52. The series of sieves includes a pre-cleaning sieve 46, an upper (or chaffer) sieve 48 and a lower (or shoe) sieve 50. The cleaning fan 52 generates an airflow through the sieves 46, 48, 50 that impinges on the grain and small MOG thereon. The small MOG is typically lighter than the grain and is therefore separated from the grain as it becomes airborne. The small MOG is subsequently discharged from the combine harvester 10 via a straw hood 54.

The preparation pan 44 and pre-cleaning sieve 46 oscillate in a fore-to-aft manner to transport the grain and small MOG to the upper surface of the upper sieve 48. The upper sieve 48 is arranged vertically above the lower sieve 50 and oscillates in a for-to-aft manner too, such that the grain and small MOG are spread across the two sieves 48, 50, while also permitting cleaned grain to pass through openings in the sieves 48, 50 under the action of gravity.

Cleaned grain falls to a clean grain auger 56 that is positioned below and in front of the lower sieve 50 and spans the width of the combine harvester 10. The clean grain auger 56 conveys the cleaned grain laterally to a vertical grain elevator 60, which is arranged to transport the cleaned grain to the grain tank 28. A yield sensor 96 may be arranged in or near the grain elevator 60 for monitoring a volume of clean grain that is transported into the grain tank 28. Once in the grain tank 28, grain tank augers 68 at the bottom of the grain tank convey the cleaned grain laterally within the grain tank 28 to an unloading tube 30 for discharge from the combine harvester 10.

A tailings return system 80 is provided to bring unthreshed ears, also called tailings, that have managed to pass through the threshing concave 42 back to the threshing section 24. After falling onto the cleaning section 26, the tailings are moved to the rear of the combine harvester 10 by the fore-to-aft oscillations of the upper sieve 48. Being heavier than the chaff that is blown out of the combine harvester 10 or towards the spreader system 74, the tailings fall off the rear end of the upper sieve 48 and then slide down the inclined bottom of the chassis of the combine harvester 10 towards a transverse return auger 82. In addition to unthreshed and incompletely threshed ears, the tailings may include other grain and MOG that fell off the rear end of the upper or lower sieves 48, 50. The amount of such material passing through the tailings return system 80 depends on, e.g., the size of the sieve openings, the fan speed of the cleaning fans 52, and the amount of crop material that is harvested per unit of time. The harvesting rate may depend on factors like crop height, header height, header width, and driving speed.

The transverse return auger 82 moves all tailings sideways to one or both lateral ends of the cleaning system 26, where they are picked up by a further return auger 84 or paddle elevator that leads the tailings upwards, back to the threshing section 24. Typically, such further return augers 84 are provided at both sides of the combine harvester 10. Optionally, a re-threshing mechanism is provided in or near the return augers 82, 84 for threshing the unthreshed ears while bringing them back towards the main threshing section 24.

Operational parameters of the threshing system 24, such as a rotational speed of the threshing rotor 40, a gap size between the threshing rotor 40 and the threshing concave 42, or an orientation of threshing elements on the threshing rotor 40 and/or the threshing concave 42 can be adjusted while harvesting. As a result of such parameter changes, the aggressiveness of the threshing process is changed, which will influence the amount of unthreshed ears ending up in the tailings return system 80. While the volume of unthreshed ears may be minimised by choosing highly aggressive threshing parameters, this will come with the undesirable side effects of damaged straw, increased energy expenditure, increased wear of parts, and possible blockage of the complete threshing system.

Similarly, other operational parameters, like header height, driving speed, fan speed and sieve openings are continuously adjusted to ensure that the full capacity of the threshing and cleaning systems 24, 26 is being used without causing blockages, grain loss, or excessive volumes of tailings in the tailings return system 80.

Accordingly, some optimisation process is needed to find the optimal operational settings. To assist in finding these optimal settings, a tailings return sensor 86 is provided in the tailings return system 80. The tailings return sensor 86 provides direct feedback indicating an amount of crop material that moves through the tailings return system 80. The tailings return sensor 86 can thus be used to determine when it may be desirable, or unnecessary, to thresh more aggressively, to open or close the sieve openings, to adjust the fan speed of the cleaning fans 52, etc. To ensure that the feedback signals from the tailings return sensor 86 are accurate and useful, it is important that the sensor 86 is properly calibrated.

Figure 2:
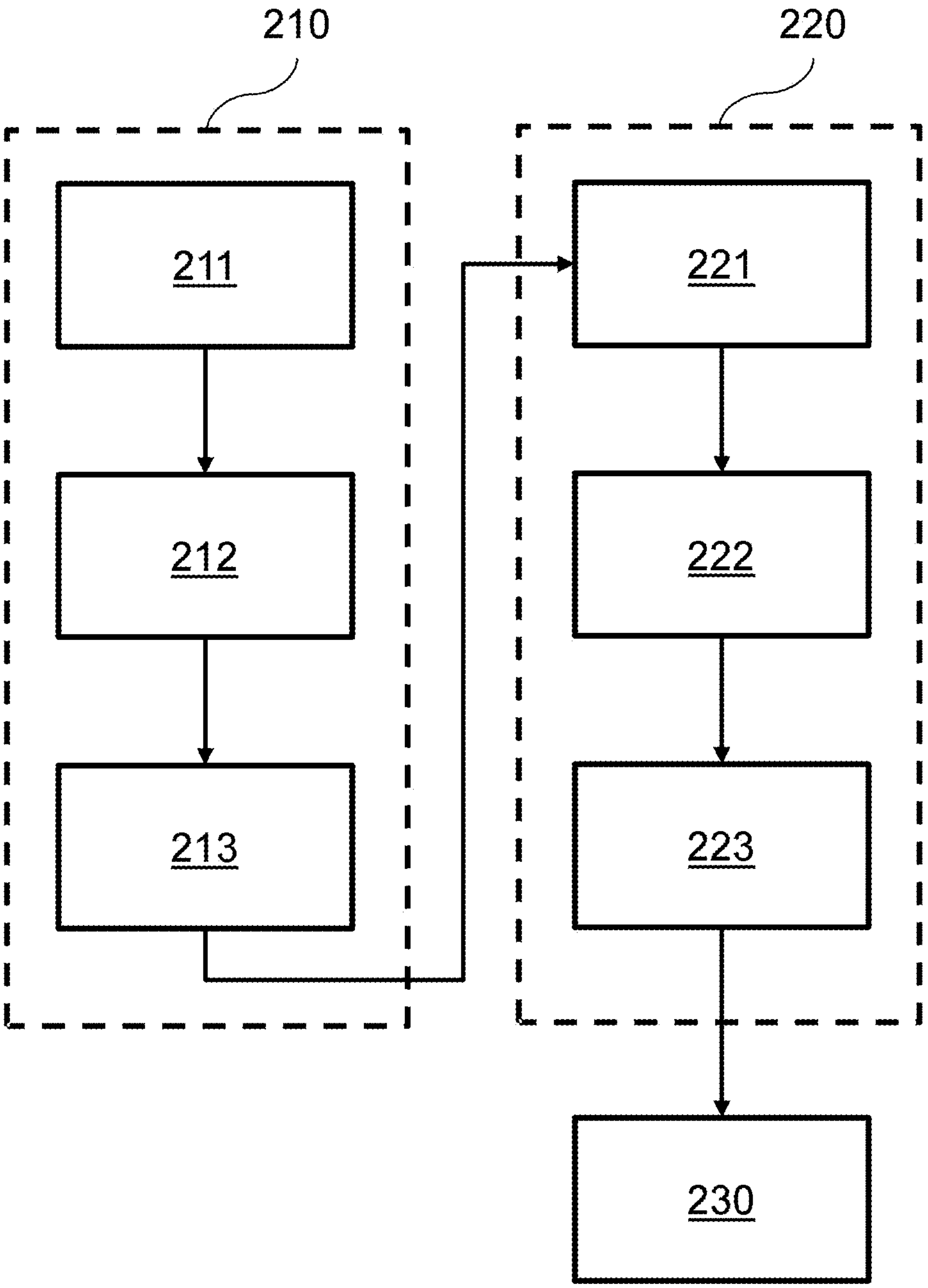
FIG. 2 shows a flow chart of a method of calibrating a tailings return sensor of the combine harvester of FIG. 1.

FIG. 2 shows a flow chart of a method of calibrating the tailings return sensor 86. In short, the method according to the invention involves repeatedly harvesting a crop with the combine harvester 10 in a set configuration, ceasing to harvest the crop while continuing to operate crop processing systems 24, 26, 60, 80 of the combine harvester 10, and determining a run-empty parameter, representative of an amount of the crop that is processed by the combine harvester 10 after ceasing to harvest the crop. The tailings return sensor 86 is then calibrated using the different run-empty parameters obtained after harvesting in different configurations.

More specifically, the exemplary method shown in FIG. 2 uses two or more test sequences 210, 220 for determining a run-empty parameter under controlled but different circumstances. After the completion of these test sequences 210, 220, in a calibration step 230, the first and second run-empty parameters or the respective tailings return volumes they represent are used to calibrate the tailings return sensor 86.

Each of the test sequences 210, 220 comprises a harvesting step 211, 221 during which the combine harvester 10 drives through a field and harvests crop, a harvesting break 212, 222, during which the combine harvester 10 temporarily stops taking in new crop while keeping its crop processing systems 24, 26, 60, 80 running, and a measurement step 213, 223, wherein the run-empty parameter is determined. The measurement of the first and second run-empty parameter is performed during the respective harvesting breaks 212, 222. The harvesting step 211, 221 in the first and second test sequences 210, 220 take place with the combine harvester 10 in respective first and second configurations. The first configuration and the second configuration are designed to cause a significantly different amount of crop material in the tailings return system. When more than two test sequences 210, 220 are used, they may each use a different harvester configuration. Alternatively, one or more of the additional test sequences are used to replicate one of the earlier test sequences 210, 220 and to repeat the measurement of the run-empty parameter corresponding to one of the previously used harvester configurations.

With this method, it is made possible to accurately estimate a variation in amount of crop material that may pass through the tailings return system 80 during operation of the combine harvester 10. When ceasing the harvesting, e.g., when driving out of the crop and onto the headland, no new crop material is pulled into the feeder 20 and threshing system 24 of the combine harvester 10. When the harvesting is paused, recently harvested crop material will still be present inside the combine harvester 10. Because the crop processing systems, such as the threshing section 24, the cleaning section 26, the clean grain elevator 60, and the tailings return system 80 will continue to process this crop material, sensors 86, 96 inside the combine harvester 10 that monitor crop flow and crop processing will continue to provide above-baseline output values until all the remaining crop has been fully processed. Consequently, various sensors 86, 96 will provide sensor outputs that are representative of the time it takes to empty the crop processing systems and of the amount of crop that is processed during this run-empty period.

In the two different configurations, the tailings return system 80 comprises significantly different amounts of crop material. As a result, the run-empty time for the crop processing systems and the run-empty profiles of the sensor signals will be different for the first and second configurations. Therefore, suitable run-empty parameters are used to estimate the tailings return volume occurring while harvesting in the two different configurations.

Knowing the possible variation in the tailings return volume, the sensitivity of the tailings return sensor 86 can be tuned such as to allow for the detection of minor variations in the amount of crop material being processed by the tailings return system 80, while ensuring that the tailings return sensor 86 provides meaningful sensor output throughout the complete range of tailings return volumes that may occur. Accordingly, the calibration process allows for finding an optimal balance between sensor sensitivity and sensor range.

In preferred embodiments, the first configuration or the second configuration is designed to cause a minimum amount of crop material in the tailings return system 80. Possible measures to minimise the tailings return volume are aggressive threshing and opening the sieves 46, 48, 50 of the cleaning system 26. When one of the two configurations results in the minimum amount of crop material in the tailings return system 80, a proper lower limit of the optimal sensor range for the tailings return sensor 86 can be established. Additionally, the other configuration may be designed to cause a maximum amount of crop material in the tailings return system 80, in order to further establish a proper upper limit of the optimal sensor range. Maximum tailings return volumes may, e.g., be obtained by reducing the threshing aggressiveness or substantially closing the sieve openings in one or more of the sieves 46, 48, 50 of the cleaning system 26. When in none of the used harvester configurations a minimum or a maximum tailings return volume is achieved, these extreme values may be extrapolated from other, intermediate tailings return volumes.

Preferably, the first configuration and the second configuration are designed to harvest the crop at a substantially similar feed rate. Exemplary operational parameters that may be controlled to control the feed rate are the driving speed of the combine harvester 10 and the height of the header 18. A feed rate sensor may be used for monitoring the feed rate, which allows for making adjustments when the feed rate changes due to external factors such as varying crop height or density. Keeping the feed rate constant within and between the different test sequences 210, 220 will ensure that any variation in tailings return volume is fully caused by a variation of operational parameters of the threshing and cleaning sections 24, 26 of the combine harvester 10, and not by a variation in the amount of crop that is harvested. Best calibration results may be achieved when harvesting at a feed rate similar to the feed rate during normal operation. Alternatively, the calibration cycle is performed more than once at different feed rates.

The step of determining the first run-empty parameter (in first measurement step 213) and the step of determining the second run-empty parameter (in second measurement step 223) typically comprise measuring a time span between the ceasing to harvest the crop and an output signal of a crop flow sensor 86 reaching a lower threshold. The output signal reaching this lower threshold is an indication that the tailings return system 80 has been emptied completely. In addition to, or as an alternative of, measuring the time to run-empty, other characteristics of the signal profile may be observed and taken into account for determining the respective run-empty parameter.

Figure 3:
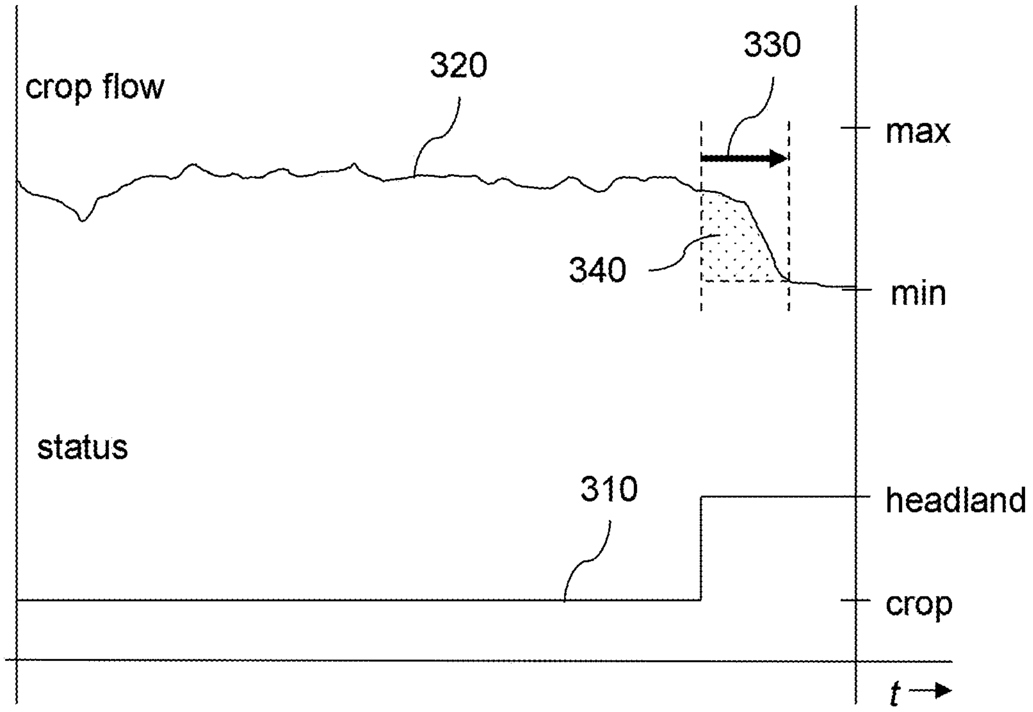
FIG. 3 visualises possible input and output signals for an embodiment of a method according to the invention.

FIG. 3 visualises possible input and output signals for an embodiment of a method according to the invention. In the upper part of the diagram, an exemplary output signal of a crop flow sensor is shown as may be observed while harvesting. The crop flow sensor signal 320 being analysed may, e.g., be a signal from the tailings return sensor 86 itself, or from the yield sensor installed in or adjacent to the clean grain elevator 60. In the lower part of the diagram, a status signal 310 is show, indicating whether the harvester 10 is driving through the crop and actively taking in the crop that is taken from the field, or whether the harvester 10 has reached a headland where no harvesting takes place and the harvester 10 may turn around to re-enter the field and resume harvesting in the opposite direction. A run-empty parameter 330, 340 may be determined, using the status signal 310 as a trigger for processing the crop flow sensor signal 320. For example, the run-empty parameter may represent a run-empty time period 330 between the harvester 10 entering the headland and the crop flow sensor signal 320 dropping to a predetermined base level. Alternatively, or additionally, the run-empty parameter may represent an amount of crop processed in that time-period. This amount of crop may be determined by calculating a surface area 340 below the crop flow sensor signal 320 in the thus determined run-empty time period 330.

What is claimed is:

1. A method for calibrating a tailings return sensor for measuring an amount of crop material in a tailings return system of a combine harvester, the method comprising the consecutive steps of:

harvesting a crop with the combine harvester in a first configuration, ceasing to harvest the crop while continuing to operate crop processing systems of the combine harvester, determining a first run-empty parameter, representative of a first amount of the crop that is processed by the combine harvester after ceasing to harvest the crop, resuming harvesting the crop with the combine harvester in a second configuration, the first configuration and the second configuration being designed to cause a different amount of crop material in the tailings return system, ceasing to harvest the crop while continuing to operate the crop processing systems of the combine harvester, determining a second run-empty parameter, representative of a second amount of the crop that is processed by the combine harvester after ceasing to harvest the crop, and calibrating the tailings return sensor based on the first run-empty parameter and the second run-empty parameter.

2. The method of claim 1, wherein either the first configuration or the second configuration is configured to cause a minimum amount of crop material, at or below a first threshold value, in the tailings return system.

3. The method of claim 2, wherein:

the first configuration is configured to cause the minimum amount of crop material in the tailings return system and the second configuration is designed to cause a maximum amount of crop material, at or above a second threshold value, in the tailings return system, or the second configuration is configured to cause the minimum amount of crop material in the tailings return system and the first configuration is designed to cause the maximum amount of crop material in the tailings return system.

4. The method of claim 1, wherein the first configuration and the second configuration are configured to harvest the crop at a substantially similar feed rate.

5. The method of claim 1, wherein the steps of determining the first run-empty parameter and of determining the second run-empty parameter comprise measuring a time span between ceasing to harvest the crop and an output signal of a crop flow sensor reaching a lower threshold.

6. The method of claim 5, wherein the tailings return sensor is the crop flow sensor.

7. The method of claim 5, wherein the crop flow sensor is a yield sensor for measuring an amount of clean grain being transported towards a grain tank of the combine harvester.

8. The method of claim 1, wherein the first configuration and the second configuration differ in at least one of:

a sieve opening of at least one sieve of a cleaning system of the combine harvester, a driving speed of the combine harvester, a threshing gap between a threshing rotor and a threshing concave, and a rotational speed of the threshing rotor.

9. A non-transitory, computer-readable storage medium storing instructions thereon that when executed by one or more processors cause the one or more processors to execute the method of claim 1.

10. A combine harvester comprising (i) crop processing systems, (ii) a tailings return sensor for measuring an amount of crop material in a tailings return system, and (iii) a controller, operatively coupled to the crop processing systems and the tailings return sensor, that is configured to perform a method of calibrating the tailings return sensor for measuring an amount of crop material in the tailings return system of the combine harvester, the method comprising the consecutive steps of:

harvesting a crop with the combine harvester in a first configuration, ceasing to harvest the crop while continuing to operate the crop processing systems of the combine harvester, determining a first run-empty parameter, representative of a first amount of the crop that is processed by the combine harvester after ceasing to harvest the crop, resuming harvesting the crop with the combine harvester in a second configuration, the first configuration and the second configuration being designed to cause a different amount of crop material in the tailings return system, ceasing to harvest the crop while continuing to operate the crop processing systems of the combine harvester, determining a second run-empty parameter, representative of a second amount of the crop that is processed by the combine harvester after ceasing to harvest the crop, and calibrating the tailings return sensor based on the first run-empty parameter and the second run-empty parameter.

* * * * *